United States Patent [19]

Louradour et al.

[11] Patent Number: 4,541,251
[45] Date of Patent: Sep. 17, 1985

[54] METHOD FOR FREEZING THE NECK OF AN INVERTED CHAMPAGNE BOTTLE

[75] Inventors: Pierre Louradour, Reims; Alain Roullet, Villejuif, both of France

[73] Assignee: L'Air Liquide, Societe Anonyme pour l'Etude et l'Exploitation des Procedes Georges Claude, Paris, France

[21] Appl. No.: 560,955

[22] Filed: Dec. 13, 1983

[30] Foreign Application Priority Data

Dec. 31, 1982 [FR] France .............................. 82 22169

[51] Int. Cl.$^4$ ............................................ F25D 17/02
[52] U.S. Cl. ............................................ 62/64; 62/65
[58] Field of Search ...................... 62/63, 374, 380, 64, 62/65

[56] References Cited

U.S. PATENT DOCUMENTS

| 1,996,781 | 4/1935 | Winton | 62/374 |
| 3,255,608 | 6/1966 | Macintosh | 62/380 |
| 3,718,007 | 2/1973 | Randrup | 62/63 |

FOREIGN PATENT DOCUMENTS

| 60351 | 5/1891 | Fed. Rep. of Germany . |
| 291859 | 3/1914 | Fed. Rep. of Germany . |

Primary Examiner—Ronald C. Capossela
Attorney, Agent, or Firm—Young & Thompson

[57] ABSTRACT

Bottles 1 are disposed in an inverted position in small groups on a tray which is placed in position on a lower frame 25 of a programmed raising and lowering portal 6. Upon each lowering of the portal, the necks of the bottles are dipped into a bath of liquid nitrogen which is maintained at a constant level. The dippings, for example three in number, are separated by stages in which the necks of the bottles are maintained out of the bath. The last dipping terminates when the necks are partly frozen, and the bottles are then conveyed to a disgorging station where the mass of ice formed is expelled so as to eliminate the sediment coming from the fermentation of the champagne.

3 Claims, 6 Drawing Figures

METHOD FOR FREEZING THE NECK OF AN INVERTED CHAMPAGNE BOTTLE

The present invention relates to a method for at least partly cooling a container; it is in particular applied to the freezing of the neck of bottles of aerated wine, which will be more simply designated hereinafter by the expression "champagne bottles", for the purpose of extracting the sediment.

Aerated wine is obtained from fermentation achieved within a bottle by yeasts which consume the fermentable sugars and give off $CO_2$ and produce alcohol. At the end of the fermentation, there is formed in the bottle which is provided with a temporary cap, a deposit (mud) of yeast and precipitate which must be removed so as to deliver a perfectly clear liquid to the consumer. The bottle is then topped up with champagne and/or a liqueur in order to obtain the desired champagne quality, and then the bottle is finally corked and labelled.

The operation for removing the sediment is termed disgorging. In any case, the bottle is first maintained inverted for a sufficiently long period to enable the sediment to accumulate in the region of its neck.

A first, purely manual, technique for removing the sediment comprises uncapping the bottle with its neck down so as to allow the sediment to leave the bottle. This method requires specialized labour and is always accompanied by the loss of a more or less large amount of liquid bearing in mind that the pressure inside the bottle is in the neighborhood of 4 bars.

This is why mechanized plants have been developed in which the neck of the bottles is frozen by dipping it in brine at $-30°$ C. In this way, there is obtained a mass of ice which traps the sediment accumulated in the neck so that it is possible to put the bottle back into its upright position and uncap it. When the edge of the mass of ice melts, the gaseous overpressure expels the mass of ice and consequently the sediment without an overflowing of the liquid. Consequently, it is possible to achieve a minimal loss of liquid.

Although this method is satisfactory from the point of view of the results obtained, it has certain drawbacks which prevent its general use by wine gatherers:

this method requires a freezing unit and a pump for circulating the brine;

owing to a phenomenon of the trapping of humidity, the concentration of the brine has a tendency to decrease; this concentration must therefore be permanently supervised.

Consequently, a plant employing brine requires a considerable investement and requires a qualified maintenance team. This is why in practice only producers dealing with large amounts of bottles, for example 3,000 to 10,000 bottles per hour, can contemplate the use of this method.

An object of the invention is to provide a method which can be carried out on a small scale with simple and relatively cheap equipment. The invention therefore provides a method for at least partly cooling a container, in particular for freezing the neck of an inverted champagne bottle, wherein the region to be cooled is dipped into liquid nitrogen in a plurality of stages separated by periods in which said region stays outside the liquid nitrogen.

A plant for carrying out the method of this invention can comprise a support adapted to carry at least one container to be at least partly cooled, a bath of a freezing liquid, and means for achieving a relative displacement between the container and the support so as to dip into the bath the region of the container to be cooled, wherein the bath is a bath liquid nitrogen and said means are adapted to effect a plurality of successive dippings of said region into the bath.

An embodiment of the invention will now be described with reference to the accompanying drawings in which.

Figure 1:
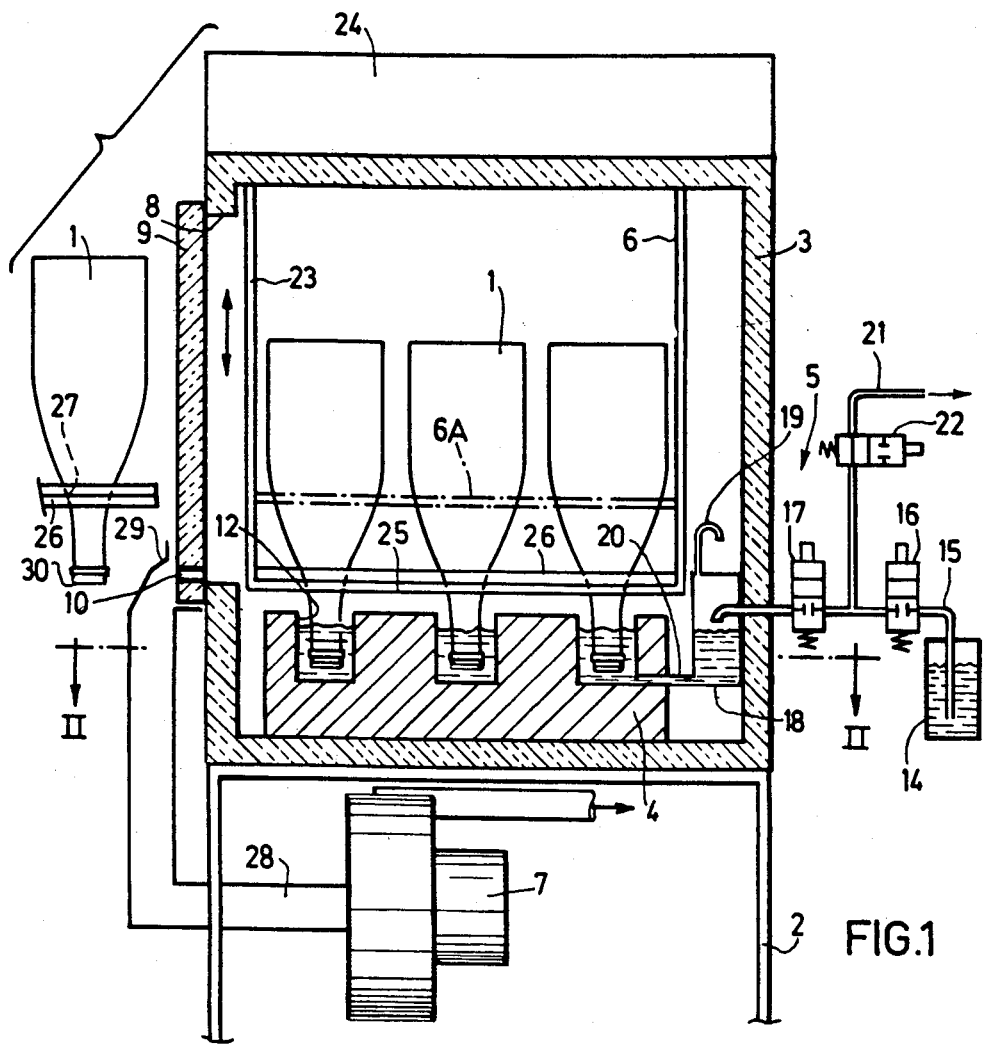
FIG. 1 is a diagrammatic sectional view of a freezing plant according to the invention.
Figure 2:
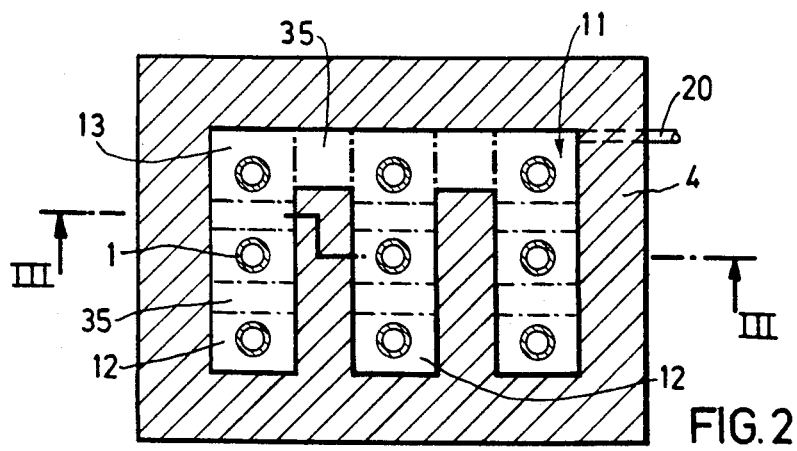
FIG. 2 is a partial sectional view of this plant taken on line II—II of FIG. 1.
Figure 3:
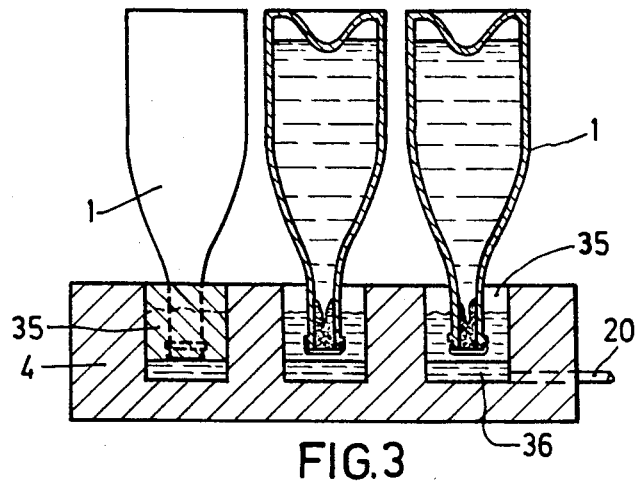
FIG. 3 is a sectional view taken on the broken line III—III of FIG. 2.

The plant shown in FIGS. 1-3 is adapted to freeze the region of the neck of champagne bottles 1 for the purpose of removing the sediment therefrom. It comprises a frame 2 which carries an enclosure 3 which is heat-insulated and in which are disposed, on the one hand, a tank 4 containing liquid nitrogen and provided with a supply device 5, and, on the other hand, a rack 6. The frame 2 also carries a fan 7.

The enclosure 3 is a box having a generally parallelepipedic shape provided on one lateral side with a large opening 8 which may be closed by a slidable door 9. This door has close to its lower edge a plurality of openings 10 which, when the door is closed, are located just above the lower edge of the opening 8.

The tank 4 is secured to the bottom of the enclosure 3 and has in its upper side a cavity 11 which has an E-shape when viewed in plan (FIG. 2) so as to define three parallel troughs 12 which are interconnected at one end by a transverse trough 13. The cavity 11 has a constant depth and each trough 12, 13 has a rectangular cross-sectional shape.

The device 5 is adapted to supply liquid nitrogen to the cavity 11 from a tank 14 which is maintained at a pressure slightly higher than atmospheric pressure, for example 1.5 bar absolute pressure. For this purpose, a pipe 15, in which are inserted in series two electrovalves 16, 17 which are normally closed, leads from the vicinity of the bottom of the tank 14 and passes through the wall of the latter and a lateral wall of the enclosure 3 and terminates in a liquid-vapour separator 18. A tube 19 provided at the top of this separator enables the vapour formed upon the expansion of the liquid nitrogen from the pressure of 1.5 bars to 1 bar to escape into the enclosure 3, and a pipe 20 leads from the bottom of the separator 18 and opens onto the bottom of the cavity 11, preferably in the transverse trough 13, so as to effect a bottom-feeding of the cavity 11. An exhaust pipe 21 communicating with the free air is connected to the pipe 15 between the electro-valves 16 and 17 and provided with a normally-open electro-valve The rack 6 comprises four vertical uprights 23 suspended from a raising and lowering mechanism 24 disposed on the upper wall of the enclosure 3. This mechanism may be, for example, a cam mechanism driven by a programming device. The uprights 23 carry at their lower end a horizontal frame 25 of rectangular shape.

The frame 25 is adapted to receive in succession a series of bottle-carrying trays 26. Each of these trays, of generally rectangular shape, has nine openings 27 whose shape matches the shape of a part of the bottles 1 located a little above the region of the neck in the supported inverted position of the bottles.

The fan 7 is disposed under the enclosure 3. Its intake is connected to a duct 28 which terminates in a case 29 in a plurality of branches. When the door 9 of the enclosure 3 is closed, its openings 10 are in facing relation to the branches of the case 29 but without contact with these branches. The latter are separated by gaps of sufficient size to allow the passage of the necks of the bottles 1 when the enclosure 3 is being loaded or unloaded.

In operation, when starting up the plant, the electro-valve 22 is closed and the fan 7 started up. A level detector (not shown) of any suitable conventional type maintains a substantially constant level of liquid nitrogen in the cavity 11 by causing the simultaneous reverse operation of the two electro-valves 16 and 17 when this level drops. Owing to the presence of the separator 18, it is the vapour-free liquid which enters the cavity 11.

With the door 9 open and the rack 6 in its upper position 6A shown in dot-dash lines in FIG. 1, a tray 26 carrying nine bottles with their necks pointing downwards is instroduced into the enclosure 3 and placed on the frame 25. Each of the bottles is provided with a temperary cap 30 which is seen better in FIGS. 4 and 5. The door 9 is then closed.

Figure 4:
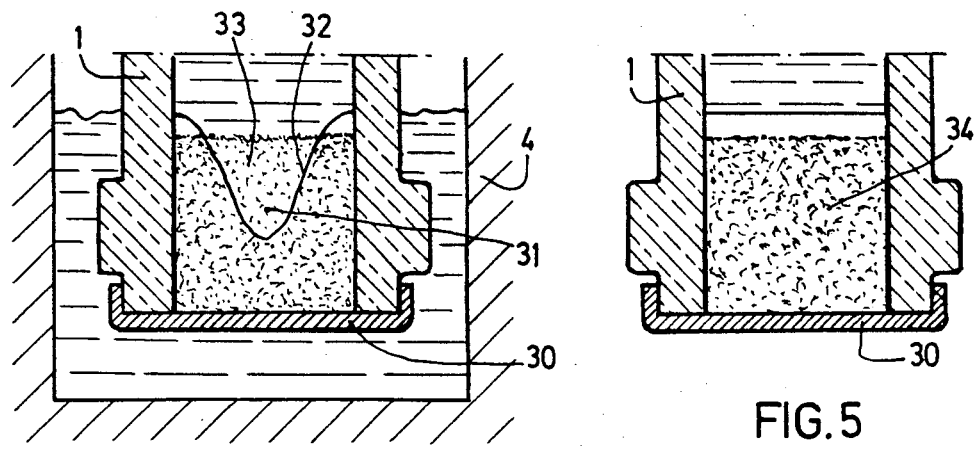
FIG. 4 is a sectional view, to an enlarged scale, of a detail of FIG. 3.

Under the control of its programming device, the mechanism 24 causes the rack 6 to effect the following successive movements:

(1) Slow descent to its lower position seen in FIG. 1, in which the necks of the bottles are dipped into the liquid nitrogen to a depth substantially corresponding to the height of the sediment 31 to be removed (see FIG. 4).

(2) Maintenance in the lower position for a relatively short pre-determined period of time.

(3) Slow rise to the upper position 6A.

(4) Maintenance in the upper position for a pre-determined relatively short period of time.

(5) Repetition at least once of the steps (1) to (4), optionally with different periods of maintenance in the lower position and/or upper position.

Lastly, the door 9 is opened, the tray 26 is discharged and conveyed to the station where the disgorging proper is carried out, and another tray 26 is introduced into the enclosure 3 for a new cycle of operation. The introduction and the discharge of the trays can be for example carried out by hand by sliding them along slideways (not shown) provided in front of the opening 8 and on the frame 25 of the rack 6.

As the nitrogen vapours formed are much heavier than air, they accumulate in the lower part of the enclosure 3 and this reduces the vaporization of the bath of liquid nitrogen. The continuous drawing off of these vapours by the fan 7 at the level of the lower edge of the opening 8 ensures safety of the personnel. Note that the cooling effect on the body of the bottles by the gaseous nitrogen is negligible notwithstanding the very low temperature of this gas (the liquid-vapour equilibrium of nitrogen under a pressure 1 bar occurs at $-196°$ C.) owing to the low coefficient of thermal transfer between this gas and the bottles. Consequently, there is no risk of a total freezing of the champagne. The space between the case 29 and the door 9 is so chosen as to draw off at the same time as the nitrogen vapours an amount of air which forms with the latter a mixture at a temperature suitable for passing through the fan 7.

It is essential to effect a plurality of consecutive dippings of the necks of the bottles for freezing them in the liquid nitrogen, so as to avoid their bursting under the effect of the thermal shock. By way of example, a cycle of three dippings found to be satisfactory is the following:

period of the first dipping into the liquid nitrogen: 10 s.

period of the maintenance outside the bath: 10 s.

period of the second dipping into the liquid nitrogen: 10 s.

period of the maintenance outside the bath: 10 s.

period of the third dipping into the liquid nitrogen: 25 s.

period of the maintenance ouside the bath: 2 min.

The last period of the maintenance outside the bath is that in the course of which the bottles are withdrawn from the enclosure 3 and conveyed to the disgorging station. More precisely, the first two dippings are essentially for cooling the glass of the neck in stages so as to avoid excessive internal stresses. The mud constituted by the sediment is frozen mainly in the course of the third dipping in starting in it outer region.

Figure 5:
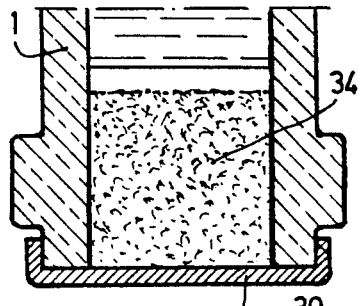
FIG. 5 is a view similar to FIG. 4 but corresponding to another stage of the treatment of the bottles.

Note that the last dipping may be stopped when the solidification front of the mud still has a roughly conical shape, as shown at 32 in FIG. 4, and a still-liquid central region of mud 33 subsists. Indeed, the cooling effect of the liquid nitrogen occurs at a sufficiently low temperature that, in the course of the conveying of the bottles to the disgorging station, the solidification front 32 progresses on its own until complete solidification of the region of the sediment in the shape of a cylindrical mass of ice 34 as shown in FIG. 5 occurs.

This very advantageous effect of the freezing by means of liquid nitrogen enables the period of the maintenance of the bottles in the enclosure 3 to be reduced. Thus, taking into account the entrance and exit periods for the bottles, the described plant, with the example of a cycle given hereinbefore, can treat about 400 bottles per hour with, as will be understood, a very small investment.

The arrangement with three electro-valves 16, 17; 22, is a safety system against leakages of liquid nitrogen when the plant is out of action. If there is only a leakage in the electro-valve 16, the nitrogen escapes through the electro-valve 22; if there are leakages in both electro-valves 16 and 17, the situation is the same because the electro-valve 22, which is fully open, opposes to the nitrogen a resistance which is much lower than that opposed by the electro-valve 17. This arrangement is particularly suitable in the described application, since the plant can be operated by non-specialized labour and can be disposed in a closed premises, for example in the champagne fermentation cellar where leakages of nitrogen would be dangerous for the personnel.

In order to reduce to a minimum the consumption of liquid nitrogen, the cavity 11 may be divided, as shown in FIG. 3 and in dot-dash lines in FIG. 2, into individual chambers for the nine bottle necks by means of eight separating partition walls 35 disposed in the cavity 11. Preferably and as shown, a small space 36 is left (FIG. 3) between these partition walls and the bottom of the cavity 11 so that the nine chambers communicate with one another and can be supplied with liquid nitrogen by a single pipe 20.

Figure 6:
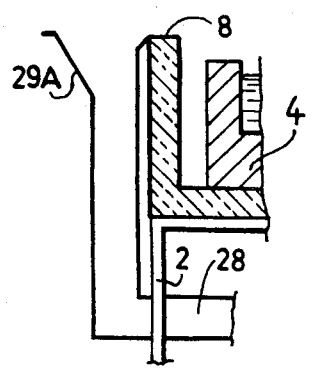
FIG. 6 is a partial view of a modification.

In another modification, partly illustrated in FIG. 6, the enclosure 3 has no door and the case 29A is open at the top; its outlet is contained in the horizontal plane which contains the lower edge of the opening 8 of the enclosure and it extends continuously throughout the length of this opening. In this case, the nitrogen vapours overflow from the opening 8 as soon as they reach this level and the case 29A is so dimensioned that an appropriate amount of air is drawn in with these vapours so that the mixture reaching the fan 7 has a suitable temperature.

With this modification, there is no risk of a clogging of the openings 10 of FIG. 1, while the arrangement of FIG. 1 has the advantage of limiting to the short periods of the opening of the door 9 the possibility of the introduction of humidity inside the enclosure 3.

It is also possible to envisage a continuous or semi-continuous treatment of the bottles 1 by means of a conveyor (linear conveyor or rotating table) effecting the desired cycle of dippings in one or more baths of suitable shapes and arrangement.

The invention may be used generally whenever a cooling by a simple dipping into liquid nitrogen presents serious drawbacks either owing to the type of the container (material or structure) or owing to the type of the product contained in this container. In any case, it avoids the creation of excessive temperature gradients, it shortens the cooling periods (and consequently reduces the investment and brings the treated articles to any temperature between the surrounding temperature and the boiling point of the nitrogen by a judicious choice of the periods of dipping into the liquid nitrogen and of the maintenance of the article outside the bath of liquid nitrogen.

What is claimed is:

1. A method for freezing a neck region of an inverted champagne glass bottle wherein precipitate settles to the neck region and is frozen for removal, comprising dipping said region into liquid nitrogen in a plurality of stages and separating said stages by periods in which said region is maintained outside the liquid nitrogen.

2. A method according to claim 1, wherein the last dipping stage is stopped when the region of the neck is only partly frozen.

3. A method according to claim 1, comprising effecting two said dipping stages of the same duration, each of which dipping stages is followed by a said period in which said region is maintained outside the liquid nitrogen for the same duration, then effecting a last dipping stage of a longer duration.

* * * * *